Feb. 1, 1938.  H. W. PEACE  2,107,251
BICYCLE
Filed Oct. 16, 1935
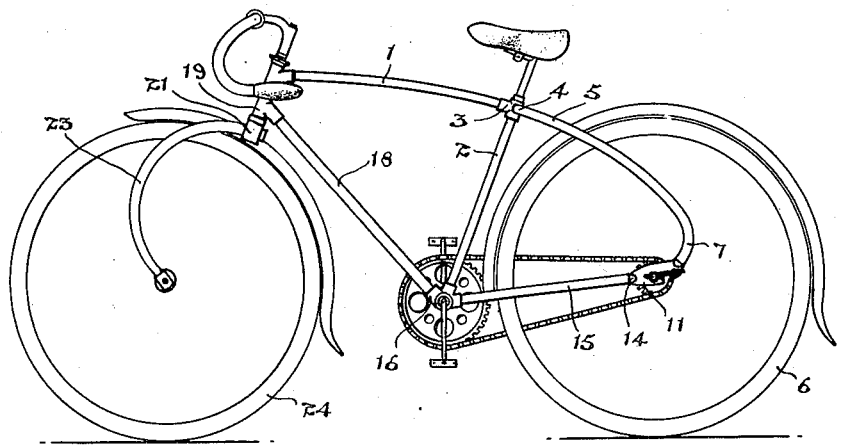
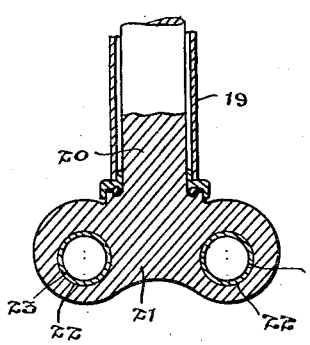
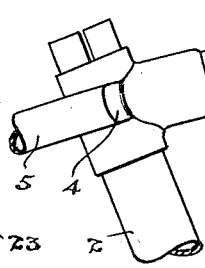
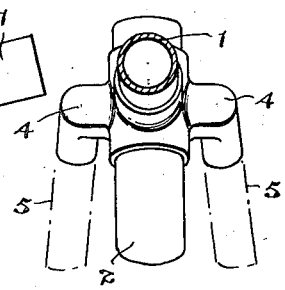
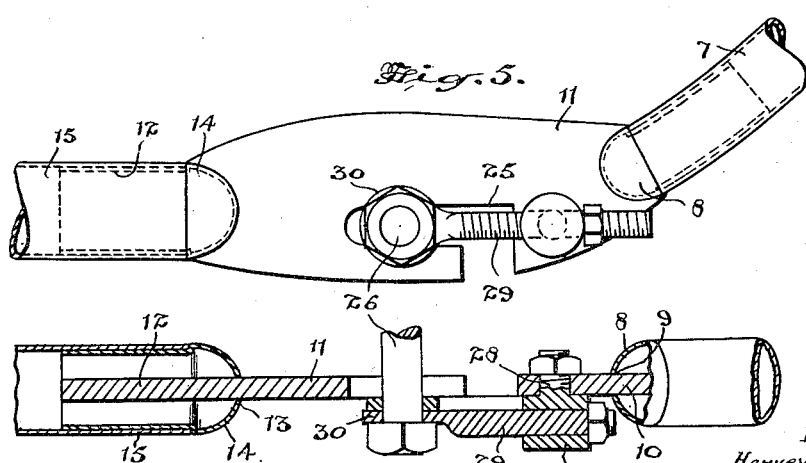
Inventor.
Harvey W. Peace.

Patented Feb. 1, 1938

2,107,251

UNITED STATES PATENT OFFICE 2,107,251

BICYCLE

Harvey W. Peace, Toronto, Ontario, Canada, assignor to Canada Cycle & Motor Company, Limited, Weston, Ontario, Canada Application October 16, 1935, Serial No. 45,296

7 Claims. (Cl. 280—284)

The principal objects of this invention are to provide a bicycle of an unusual novel and attractive appearance which will have a distinct appeal to the eye in conformance with the line adopted in the streamlining of vehicles and further, to utilize the streamline effect of design to accomplish a very distinct improvement in the riding qualities of the bicycle to effect the absorbing of road shocks and further, to provide a very desirable form of bicycle having a distinctly novel appeal.

The principal features of the invention consist in the novel construction of the main frame whereby the upper bar is curved to blend with the curvature of the upper rear forks which are curved in loop formation at their lower ends to meet the rear ends of the lower fork and to form a continuous part therewith and the front forks are curved downwardly with their lower ends bent rearwardly to form a resilient front support corresponding in part with the resilient rear fork.

In the accompanying drawing, Figure 1 is a side elevational view of my improved streamlined resilient bicycle.

Figure 2 is an enlarged sectional elevational view through the fork head of the front fork.

Figure 3 is a side elevational view of the frame connection at the juncture of the top bar and upper end of the rear fork.

Figure 4 is a sectional front elevational view of the upper rear fork connection bracket shown in Figure 3.

Figure 5 is an enlarged side elevational detail of the rear fork wheel support.

Figure 6 is a longitudinal sectional view through the structure illustrated in Figure 5.

In the manufacture of bicycles it has been the practice for many years to construct the frame in accordance with a "standard" pattern which in side elevation is substantially diamond-shape or of a rhomboid formation with the rear forks extending substantially horizontally from the crank bracket and mating the rear braces or upper forks at an acute angle where the axle of the wheel is mounted in slotted brackets and the front forks of said "standard" type of bicycle slope straight down from the head or front end of the frame having a slight curve forward for the castor effect.

In the "standard" type of bicycle the frame and forks are perfectly rigid and all shocks and vibrations of road travel are carried directly through the frame and transmitted to the rider.

It is the dual purpose of this invention to devise a bicycle which will be easier to ride, its construction being such as to eliminate most of the minor vibrations and many of the major ones, or at least to greatly soften the transmission of such to the rider and further, to provide a bicycle which will appeal to the eye as conforming to present-day standards of streamlining effects.

In carrying these ideas into practice, I have constructed a bicycle as shown in the accompanying drawing with the frame formed of a longitudinally arched upper reach bar 1 connected to the upright bar 2 by a bracket 3, which bracket is formed with lugs 4 arranged on opposite sides to which are secured a pair of tubular members 5 which extend rearwardly and curve downwardly in a streamline continuation of the curve of the arched upper bar 1.

These rear tubes 5 form the upper rear fork of the bicycle between which the rear wheel 6 is arranged and the lower ends of these tubes are curved downwardly and forwardly in a short bend 7. The ends of these tubes are provided with ferrules 8, each having a longitudinal centrally arranged slot 9 open at the outer end to receive the lug end 10 of a plate 11. The plates 11 extend horizontally and are formed with lugs 12 at the opposite ends which extend into the slots 13 of the ferrules 14 secured in the ends of the tubular fork members 15 which are secured to and extend rearwardly from the crank bracket 16. The crank bracket is connected with the bracket 3 by the upright tube 2.

The lower reach bar of the frame is formed in the tube 18 which extends angularly upward from the crank bracket to the head 19 which is connected to the forward end of the upper bar 1.

A fork stem 20 is journalled in the head 19 and has mounted upon its lower end a solid bracket 21 which forms the fork head. This bracket is provided with a pair of holes 22 spaced equi-distant either side of the centre or axial line of the fork stem and in these holes are mounted the forwardly curved fork tubes 23, which extend forward from the fork head and curve downwardly and backwardly, the outer extremities being mounted upon the axle of the front wheel 24.

The plates 11 which form an integral part of the rear forks of the frame, are formed with a longitudinal slot 25, in which the ends of the axle 26 of the rear wheel 6 are slidably mounted. The rear ends of the slots 25 open through the bottom of the plate to allow of the insertion and removal of the axle.

Blocks 27 provided with stud ends 28 are mounted in each of the plates 11 back of the slots 25 and adjusting screws 29 are slidably mounted in these blocks and are formed with eye-ends 30 to encircle the ends of the axle 26, the screws 29 having nuts threaded on their ends and abutting the blocks 27.

It will be readily understood that the rear end of the bicycle frame is formed of a pair of tubular loops extending rearwardly from the upright tube 2 forming the upper and lower forks extending either side of the wheel 6. The rear wheel axle is supported in the slotted members 11, so that the load carried by the bicycle is supported upon a pair of looped forks which are constructed of very resilient steel tubing and vibrations transmitted to the wheel from road surfaces will be absorbed to a very considerable extent by this loop construction and the tubes which are preferably made of chromium molybdenum, will withstand such vibrations without crystallization and resultant fracture.

At the front end of the bicycle the forwardly extending downwardly curved forks, having their terminal ends turned rearwardly, present a flexible support for the load and the vibrations imparted to the wheel from the road surface are absorbed throughout the entire length of the forks and reduced to their minimum before they reach the fork head or crown.

The fashioning of the front and rear forks in the manner described, together with the curved upper bar impart to the bicycle a "streamline" effect which is very novel and attractive to the eye, while the said streamline effect produces the flexibility previously described.

The construction herein described also produces a bicycle having the required transverse rigidity which ensures the maintenance of the alignment of the front and rear wheels.

The applicant is aware that many years ago it was proposed to manufacture bicycles with resilient frames made up of resilient wooden bars or spring bars, but such constructions were impractical and had to be abandoned, but the construction as herein shown and described involves a novel development which has been demonstrated to effectively resist the strains that may be placed upon it and a new and useful result has been achieved.

The novel construction of the front forks has not only clearly demonstrated the fact that the riding effect is much smoother, but the steering effort is much easier than with the standard type of rigid forks which has substantially no easement upon the endwise shocks imparted through the roughness of road surfaces.

It is also found that the life of the tires is greatly enhanced.

It may be found desirable to construct the members 11 so that they will have a sleeve or tubular formation to fit over the fork tubes in which case the rear forks will be each formed of a single length of tubing.

What I claim as my invention is:—

1. In a bicycle, a frame having a pair of part-elliptical tubular forks, metal plates interposed in the length of the said tubular forks on the underside of the elliptical shape and each having longitudinal slots therein opening downwardly at one end to receive the wheel axle, studs mounted in said plates to the rear of said slots, adjusting screws mounted in said studs embracing the axle ends, and means for locking said adjusting screws.

2. A bicycle frame comprising a rigid structure formed of a head, upper and lower reaches and an upright rigidly connected to the upper reach, an upper rear fork forming a rearward extension of the upper reach and formed of spring tubing curved in a generally downward direction and terminating adjacent its lower end in forwardly extending return bent portions to form spring loops capable of flexing in vertical planes but having sufficient inherent lateral rigidity to effectively resist lateral stresses and hold the wheel in proper alignment therebetween, a lower rear fork having the rearward ends spaced in a longitudinal direction from the ends of the upper fork, the said lower fork being provided with a device for adjustably supporting a wheel, and means connecting the ends of the upper fork to said device.

3. A bicycle frame having a head, upper and lower reaches and an upright all rigidly connected together, upper and lower tubular spring rear forks, the upper fork being rigidly connected at the junction of the upright and the upper reach and curving downwardly and rearwardly therefrom and having the rear end portions of the tubes curved forwardly to form resilient loops the terminal ends of which are spaced longitudinally from the rearward terminal ends of the lower fork tubes, and bridge members of flattened slotted formation interposed between the terminal ends of said upper and lower forks for adjustably supporting the wheel forwardly of said resilient loops, said rear fork structure being capable of vertical flexure and solely of sufficient lateral rigidity to maintain the alignment of the wheel mounted therein.

4. In a bicycle, a frame formed with a rigid forward structure and an upper tubular spring rear fork curving downwardly and rearwardly therefrom to a short forward bend forming resilient loops, said rear forks being solely of sufficient lateral rigidity to maintain the alignment of the wheel mounted therein, wheel supporting members slotted to adjustably support the wheel axle and being secured to the forwardly extending ends of said resilient loops, and a lower tubular spring rear fork having its rearward ends connected to said wheel supporting members.

5. In a bicycle, a frame formed with a rigid forward structure and an upper tubular spring rear fork curving downwardly and rearwardly therefrom to a short forward bend forming resilient loops, said rear forks being solely of sufficient lateral rigidity to maintain the alignment of the wheel mounted therein, wheel supporting members slotted to adjustably support the wheel axle and being rigidly secured to the forwardly extending ends of said resilient loops, and a lower tubular spring rear fork having its rearward ends connected to said wheel supporting members.

6. A bicycle as claimed in claim 3 having tubular extensions from said bridge members snugly interfitting with the spaced tubular ends of said upper and lower forks.

7. A bicycle having a frame formed of steel tubing having its upper reach bar arched with a continuous downward and rearward slope from the forward end to the rear and having an upper rear fork of spring tubing forming arched continuations of the upper reach and being of progressively increasing downward curvature toward the rear end and terminating in a local forward curvature forming spring loops, a lower rear fork having its rearward ends spaced from the terminal ends of said spring loops, said rear forks being solely of sufficient lateral rigidity to maintain the alignment of the wheel mounted therein without external bracing and means interposed between the longitudinally spaced ends of said upper and lower forks adjustably securing the rear wheel axle with its axis disposed forwardly of the terminal ends of said spring loops.

HARVEY W. PEACE.